United States Patent [19]
Eichholz et al.

[11] Patent Number: 5,996,965
[45] Date of Patent: Dec. 7, 1999

[54] SOLENOID VALVE

[75] Inventors: Heinz-Dieter Eichholz, Iserlohn; Karl Heinz Denkena, Dusseldorf, both of Germany

[73] Assignee: Firma A.U.K. Muller GmbH & Co. KG, Dusseldorf-Hellerof, Germany

[21] Appl. No.: 09/178,105

[22] Filed: Oct. 23, 1998

Related U.S. Application Data

[63] Continuation-in-part of application No. 08/916,657, Aug. 22, 1997, abandoned.

[51] Int. Cl.⁶ .................................................. F16K 31/02
[52] U.S. Cl. .................................. 251/30.05; 251/129.17
[58] Field of Search ........................... 251/30.02, 30.03, 251/30.04, 30.05, 129.17

[56] References Cited

U.S. PATENT DOCUMENTS

| | | | |
|---|---|---|---|
| 3,253,615 | 5/1966 | Armstrong | 251/30.05 |
| 4,295,488 | 10/1981 | Book | 251/30.05 X |
| 5,069,420 | 12/1991 | Stobbs et al. | 251/30.02 |
| 5,707,039 | 1/1998 | Hamilton et al. | 251/129.17 |
| 5,772,180 | 6/1998 | Palma et al. | 251/129.15 |
| 5,911,240 | 6/1999 | Kolar et al. | 251/30.04 X |

*Primary Examiner*—Kevin Lee
*Attorney, Agent, or Firm*—Sprung Kramer Schaefer & Briscoe

[57] ABSTRACT

A solenoid valve especially intended for wet-room fittings. It has a housing with an intake and an outlet sealed off from each other and prevented from communicating while the valve is closed by a body that rests on a seat. The housing is essentially flower-pot shaped and has a threaded section at the open end positioned concentric and coaxial to the intake and outlet, which are in turn rotationally symmetric and face the open end such that the incoming flow is opposite the outgoing flow.

11 Claims, 3 Drawing Sheets ized demands on the seat and membrane-accommodating surface affect the manufacture of the housing. It is also impossible to test how well the valve functions in isolation. This leads to warranty problems between the manufacturer of the valve and the manufacturer of the fitting.

SOLENOID VALVE

This application is a continuation-in-part application of application Ser. No. 08/916,657 filed Aug. 22, 1997 now abandoned.

BACKGROUND OF THE INVENTION

The present invention concerns a solenoid valve especially intended for wet-room fittings. It has a housing with an intake and an outlet. They are sealed off from each other and prevented from communicating while the valve is closed by a body that rests on a seat.

Conventional solenoid valves are difficult to install in many situations, and only by taking into account their considerable size. Attempts have been made to get around this by molding both the seat and the membrane-accommodating surface into the housing and by appropriately adapting the pilot valve during installation.

This approach is problematic, however, because the solenoid-valve manufacture's severe dimensional demands on the seat and membrane-accommodating surface affect the manufacture of the housing. It is also impossible to test how well the valve functions in isolation. This leads to warranty problems between the manufacturer of the valve and the manufacturer of the fitting.

There is no "solenoid valve" as such in the form of a self-contained component that can be replaced during maintenance or repair.

SUMMARY OF THE INVENTION

This is where the present invention comes in. Its object is an enclosed and sealed solenoid valve that can simply be integrated into the housings of wet-room fittings for example without encountering the aforesaid problems and drawbacks.

This object is attained in accordance with the present invention in that the body of the valve includes a membrane, in that a counterpressure chamber is positioned on the side of the membrane facing away from the valve's seat and communicates with the valve's intake by way of a channel and with the valve's outlet by way of the nozzle of a pilot valve actuated by the magnetic plunger of a bistable electromagnet, whereby the valve's housing is essentially shaped like a flowerpot open at one end and having a threaded section in the vicinity of that end, whereby the intake and outlet are each rotationally symmetrical and positioned mutually concentric at the open end of the flowerpot, in that the outlet is positioned centrally and is annularly surrounded by the intake, with the incoming flow opposing the outgoing flow, and whereby the membrane, the seat, and the threaded section are concentric with the outlet, with the intake and the outlet each having a connection, the outlet connection extending axially farther out to a prescribed length than the intake connection does, both connections having seals.

The valve in accordance with the present invention is a servo valve controlled by a pilot valve. The body of the valve is actuated automatically by the medium, water for example, flowing through it. Such a valve is particularly well enclosed and tight. Valves of this type are also called encapsulated solenoid valves.

The rotational symmetry of the valve with its coaxially aligned intake and outlet allows a compact and space-saving design and simple and space-saving installation.

The housing is easy to manufacture without particularly precise tolerances.

Since the valve itself is responsible for the overall valving function, it can be tested as a total assembly before being installed.

The valve can be easily disassembled with commercially available tools for maintenance and repair. The filter in the intake and the optional flow controls in the outlet are accessible and can be cleaned or replaced.

A plumbing fitting in accordance with the invention has a tubular component with a water-discharge pipe at one end and a water-entry pipe at the other. A plug accommodating a bore, is positioned in the vicinity of the water-entry pipe, the bore having an expanded section at the upper edge and an accommodation for a liquid-conveyance port resting on its base. The solenoid according to the invention is installed in the plug with its intake connection accommodated in the expanded section and its outlet connection in the accommodation, the valve's intake communicating with the water-entry pipe and the valve's outlet with the water-discharge pipe by way of the liquid-conveyance port and liquid-conveyance lines.

Further advantages and characteristics of the present invention will be evident from the following disclosure including the description and the drawing.

One preferred embodiment of the present invention will now be specified with reference to the drawing, wherein:

DETAILED DESCRIPTION OF THE INVENTION

Figure 1:
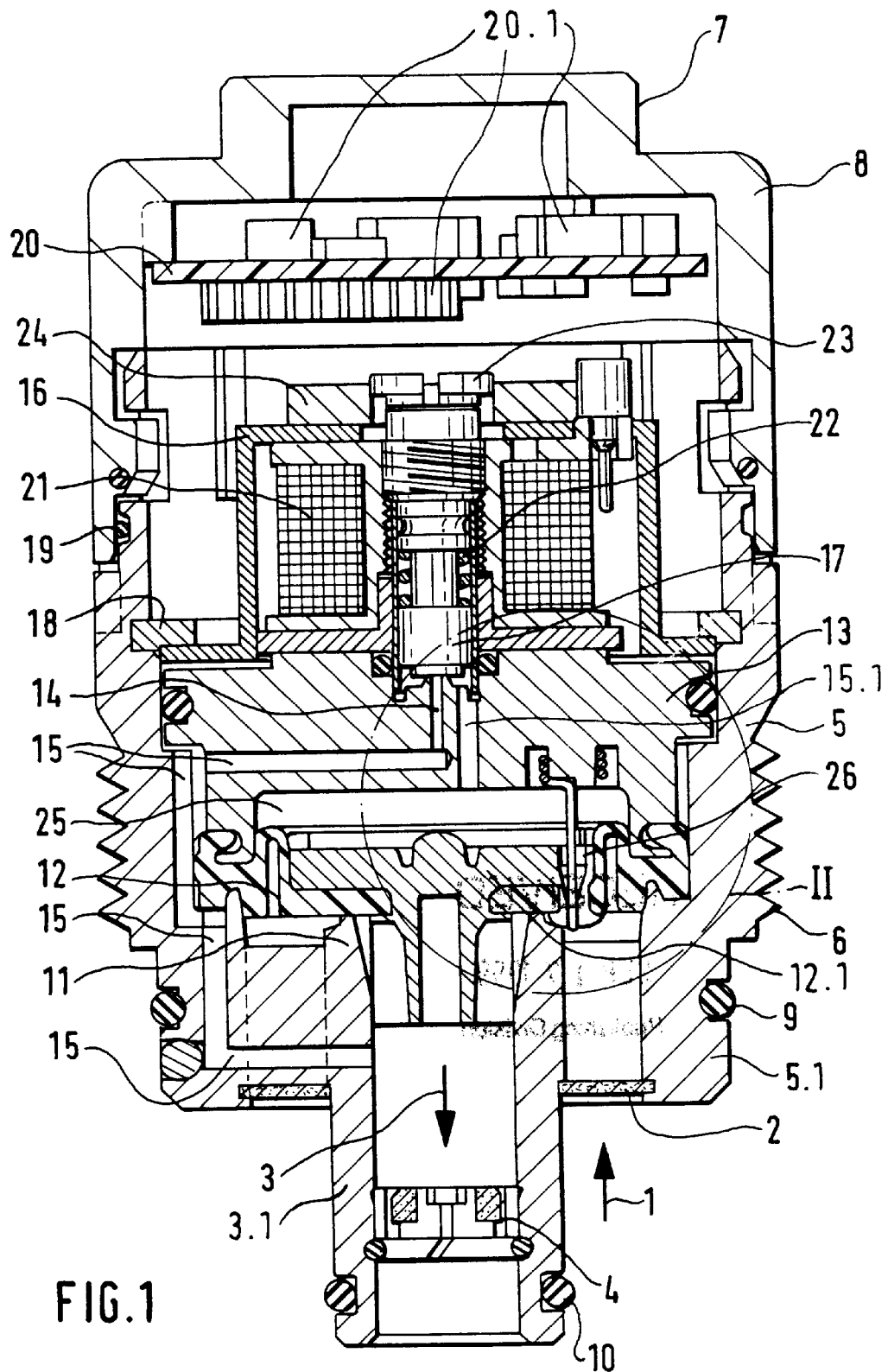
FIG. 1 is a longitudinal section through the valve.

The solenoid valve in the figures is an encapsulated servo solenoid valve. It has a lower housing half 5 with a central outlet 3 and coaxially positioned intake ports 1 that form a ring around the inlet. Accommodated in intake 1 is a fine-mesh screen 2 that intercepts solids and suspended particles. Outlet 3 can also be provided with flow controls 4.

Intake 1 and outlet 3 are each rotationally symmetrical. The medium flows in in one direction and out in the opposite direction. Outlet 3 has a connection 3.1 and intake 1 a connection 5.1, Outlet connection 3.1 extending axially farther out to a prescribed length than intake connection 5.1 does. The valve can be connected with connections 3.1 and 5.1 to a plumbing fitting as will be specified hereinafter with reference to FIG. 3. The joint is sealed with an O ring 10 on outlet connection 3.1 and another O ring 9 on intake connection 5.1.

Figure 3:
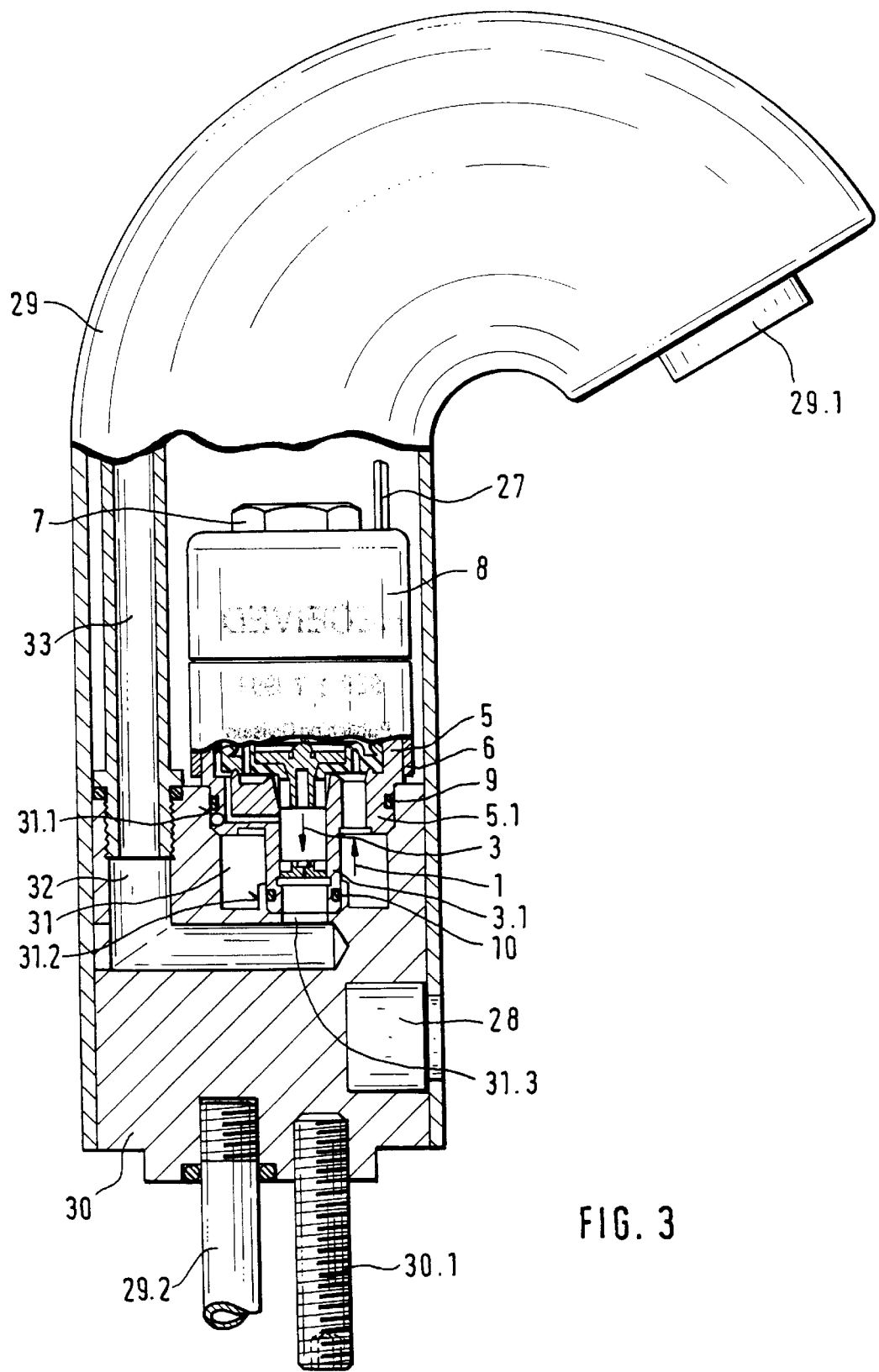
FIG. 3 is a section through part of a plumbing fitting accommodating a solenoid valve of the type illustrated in FIG. 1.

A threaded section 6, coaxial with intake 1 and outlet 3, and a hexagonal section 7 of cap-shaped upper housing half 8 allow the valve to be installed in the fitting illustrated in FIG. 3.

Since the valve's seat 11 tapers out in the form of a cone, the volume of medium flowing through it will be extraordinarily high in terms of its nominal width, attaining more than 1.2 m$^3$ per hour at a pressure difference of 1 bar. This level is sufficient to handle the demands of sink and urinal fittings. The valve's housing comprises a lower half 5 and an upper half and is shaped on the whole like an open-ended flowerpot. Intake 1 and outlet 3 are at the open end of the pot. Accommodated in lower housing half 5 and sealed with an O ring is a flat adapter 13. A membrane, especially a roll-up membrane 12, is snapped over the side of adapter 13 facing seat 11. Membrane 12 constitutes, in conjunction with an insert 12.1, the body of the valve. Adjacent to the side of membrane 12 facing away from seat 11 is a counterpressure chamber 25. Chamber 25 communicates with intake 1 by way of a channel 26 in membrane 12. Adapter 13 accommodates the nozzle 14 of a pilot valve. The pilot valve is actuated by a magnetic plunger 17 that constitutes a component of a bistable electromagnet 16. Nozzle 14 can be closed by plunger 17. Counterpressure chamber 25 communicates with outlet 3 by way of nozzle 14 and channels 15 and 15.1.

Electromagnet 16 is mounted along with its exciter coil 21 and its plunger 17 on adapter 13. The force exerted by a compression spring 22 closes the valve, and that exerted by the soft-iron core of a thrust-adjusting screw 23 surrounded by a permanent magnet 24 closes it. The magnetic system is bistable and pulse-controlled, and its power is supplied by a battery or by house current.

A ring 18 secures the built-in components in lower housing half 5. Lower housing half 5 is attached to upper housing half 8 by a limited-insertion snap-in attachment sealed with an O ring 19, preventing the upper half from rotating on the lower half. Upper housing half 8 can accommodate a printed-circuit board 20 with connections embedded water-tight.

FIG. 1 illustrates a valve with a bistable electromagnet and in the closed state.

How the solenoid valve in accordance with the present invention operates will now be specified.

When an exciter coil 21 in an electromagnet 16 receives a direct-current pulse, a plunger 17 is attracted against the soft-iron core of a threaded thrust-limiting bolt 23 contrary to the force of a spring 22. Since the force exerted by a permanent magnet 24 is more powerful than that exerted by the spring 22, the plunger 17 will remain in that position when the exciter current is discontinued.

Plunger 17 opens pilot nozzle 14, decreasing the pressure in a counterpressure chamber 25 that communicates with intake 1 through a channel 26. The pressure of the water against the bottom of membrane 12 raises it toward counterpressure chamber 25, releasing seat 11 and allowing the water to flow to outlet 3 from intake 1.

To seal seat 11 again, current is forwarded through exciter coil 21 in the opposite direction, and the field of permanent magnet 24 weakens while spring 22 releases plunger 17 from the surface it is resting against, closing pilot nozzle 14. Counterpressure chamber 25 will now fill again through the channel 26 in one side of membrane 12, and the increased pressure in the counterpressure chamber will force the membrane 12 against seat 11.

Figure 2:
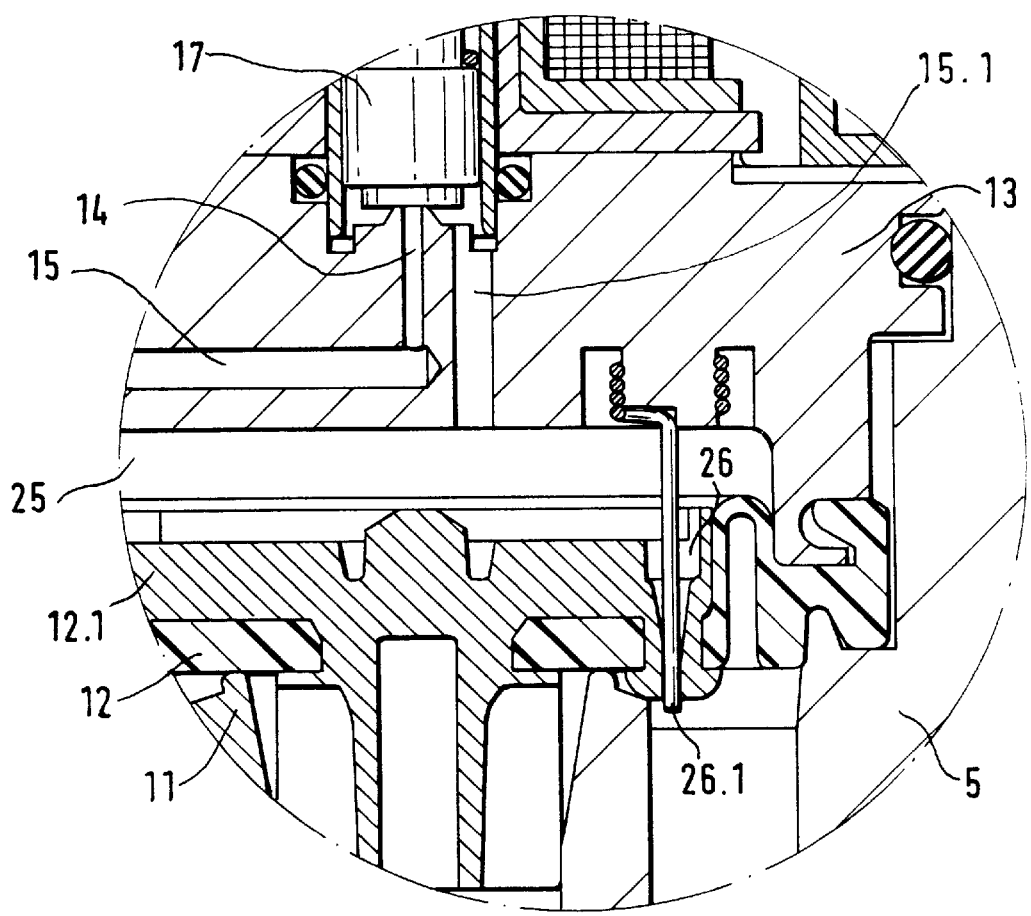
FIG. 2 is a larger-scale section through the area II in FIG. 1.

As is shown in FIG. 2, a spring-loaded cleaning pin 26.1 travels back and forth inside channel 26.

FIG. 3 illustrates a bent-tubular component 29 of a sink fitting with a water-discharge pipe 29.1 at one end and a water-entry pipe 29.2 at the other. Positioned in the vicinity of water-entry pipe 29.2 is a plug 30. On the bottom of plug 30 is a bolt 30.1 for fastening it to the unillustrated base of the fitting. The top of plug 30 is provided with a bore 31. At the upper edge of bore 31 is an expanded section 31.1 that accommodates the intake connection 5.1 of a solenoid valve of the type illustrated in FIG. 1. Resting on the base of bore 31 is a liquid-conveyance port 31.3 with an accommodation 31.2 for the valve's outlet connection 3.1. With the solenoid valve installed as illustrated in FIG. 3, intake 1 communicates with water-entry pipe 29.2 through invisible breaches in plug 30. Outlet 3 on the other hand communicates with a channel 32 that merges into a length 33 of pipe leading to water-discharge pipe 29.1.

A proximity sensor 28 on the front of plug 30 detects anyone approaching the sink and transmits a signal to the valve over an only partly illustrated electric line 27. The signal is forwarded to controls 20.1 on the valve's printed-circuit board 20 (also illustrated in FIG. 1), and the valve opens as hereinbefore specified.

It will be evident from FIG. 3 that such a valve will occupy very little space when installed in a sink fitting and can easily be replaced.

What is claimed is:

1. A solenoid valve for use in wet-room fittings, comprising: a housing with an intake and an outlet sealed off from each other and prevented from communicating while the valve is closed by a body that rests on a seat, wherein the body of the valve includes a membrane and a counterpressure chamber is positioned on the side of the membrane facing away from the valve seat and communicates with the valve intake by way of a channel and with the valve outlet by way of a nozzle of a pilot valve actuated by a magnetic plunger of a bistable electromagnet, wherein the valve housing is essentially shaped like a flowerpot open at one end and having a threaded section in the vicinity of that end, wherein the intake and outlet are each rotationally symmetrical and positioned mutually concentric at the open end of the flowerpot, wherein the outlet is positioned centrally and is annularly surrounded by the intake, with the incoming flow opposing the outgoing flow, and wherein the membrane, the seat, and the threaded section are concentric with the outlet, with the intake and the outlet each having a connection, the outlet connection extending axially farther out to a prescribed length than the intake connection does, both connections having seals.

2. The solenoid valve as in claim 1, wherein the housing comprises a lower housing half and an upper housing half that fit tight together, cannot rotate relative to each other, and are sealed off from each other by an O-ring.

3. The solenoid valve as in claim 2, wherein the upper housing half is cap-shaped and has a hexagonal section at the closed end, and in that a printed-circuit board with connecting lines or contacts is secured and embedded water-tight in the upper housing half.

4. The solenoid valve as in claim 1, wherein the bistable electromagnet has a pulse output less than one watt.

5. The solenoid valve as in claim 1, wherein the valve is installable in any desired position.

6. The solenoid valve as in claim 1, wherein the outside diameter of the housing is less than 35 mm.

7. The solenoid valve as in claim 1, wherein the seat is funnel-shaped.

8. The solenoid valve as in claim 1, wherein the volumetric flow per hour is greater than 1.2 m$^3$ at a pressure difference of 1 bar.

9. The solenoid valve as in claim 1, further comprising a fine-mesh filter in its intake.

10. The solenoid valve as in claim 1, further comprising flow controls in its outlet.

11. A plumbing fitting comprising a tubular component with a water-discharge pipe at one end and a water-entry pipe at the other, wherein a plug accommodating a bore is positioned in the vicinity of the water-entry pipe, the bore having an expanded section at the upper edge and an accommodation for a liquid-conveyance port resting on its base and wherein a solenoid valve as recited in claim 1 is installed in the plug with its intake connection accommodated in the expanded section and its outlet connection in the accommodation, the valve intake communicating with the water-entry pipe and the valve outlet with the water- discharge pipe by way of the liquid-conveyance port and liquid-conveyance lines.

* * * * *